Patented Jan. 19, 1926.

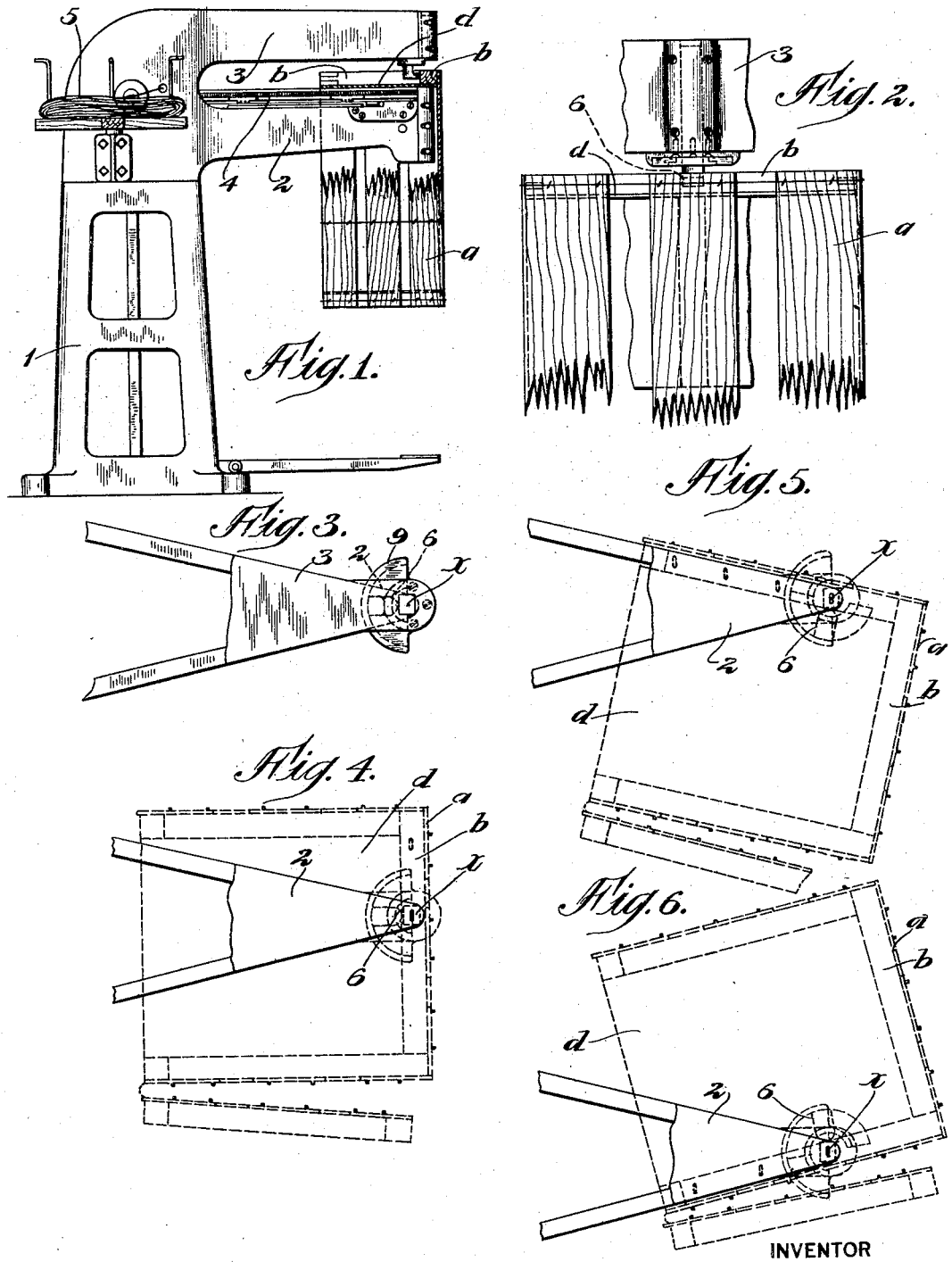

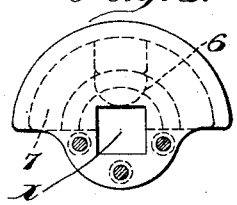
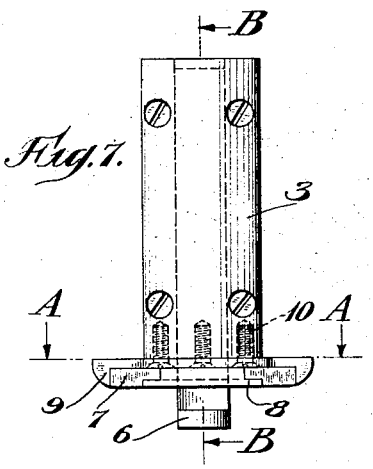
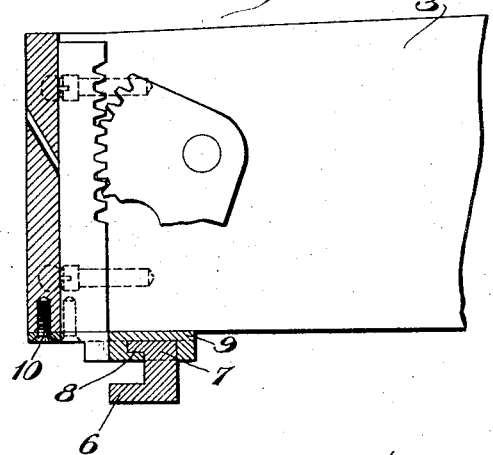
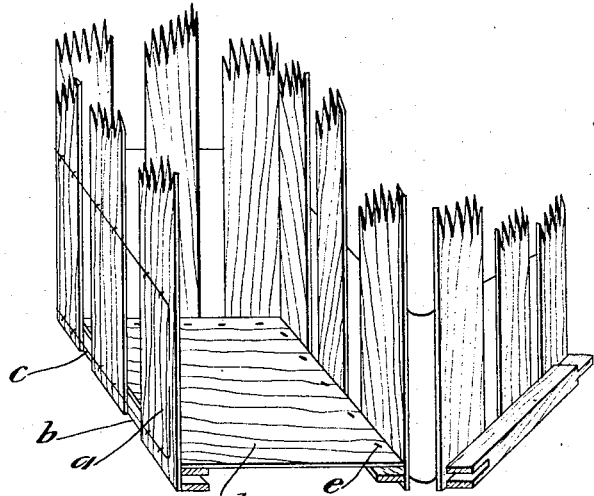
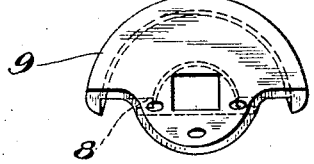
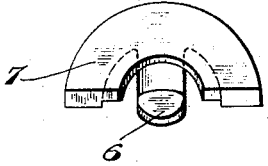

1,570,539

UNITED STATES PATENT OFFICE.

OSCEOLA C. THOMPSON, OF ROCKAWAY, NEW JERSEY, ASSIGNOR TO WIREBOUNDS PATENTS COMPANY, A CORPORATION OF MAINE.

MACHINE FOR USE IN MAKING BOXES OR CRATES.

Application filed March 24, 1921. Serial No. 455,301.

*To all whom it may concern:*

Be it known that I, OSCEOLA C. THOMPSON, a citizen of the United States, and a resident of the borough of Rockaway, in the county of Morris and State of New Jersey, have invented a new and useful Improvement in Machines for Use in Making Boxes or Crates, of which the following is a specification.

The invention relates to machines for use in fastening heads, ends or the like to boxes, crates or the like, such machines being sometimes referred to as "end stapling machines."

Among other objects, the invention is intended to provide a machine of the class described, having improved means for controlling or positioning the box or crate parts during fastener driving operations.

One illustrative form of machine embodying the invention is shown in the accompanying drawings in which:

Fig. 1 is a general side elevation view of a machine embodying the invention, showing a crate partly broken away in position to be operated upon.

Fig. 2 is an enlarged front elevation of the nose of the machine showing a crate in position to be operated upon.

Fig. 3 is a top plan view of the nose of the machine showing the work-controlling means.

Figs. 4, 5 and 6 are plan views of the nose of the machine showing a crate being operated upon in different positions. In said figures the lower arm of the machine is shown in full lines for clearness of description.

Fig. 7 is an enlarged front elevation of the nose of the upper arm and the work-controlling means.

Fig. 8 is a sectional plan view taken on the line A—A of Fig. 7.

Fig. 9 is a sectional elevation taken on the line B—B of Fig. 7.

Fig. 10 is a perspective view of the stationary body member of the work-controlling means.

Fig. 11 is a perspective view of the movable member of the work-controlling means.

Fig. 12 is a perspective view of a portion of a wire bound crate showing an end section fastened to the cleats of side sections.

One illustrative type of crate upon which the machine is designed to operate is partly illustrated in Fig. 12. The crate there shown is commonly referred to as a sectional wire bound crate and consists of four separate sections of slatted side material *a* and cleats *b* connected together in foldable relationship by binding wires *c* stapled thereto, and head or end sections *d* stapled to the cleats *b* of one or more side sections by staples *e* as illustrated. In practice the materials for the four sides of the crate are usually assembled and secured together in a crate blank machine which connects the four sides of the crate with wires producing what is commonly referred to as a crate blank. The blank thus formed is partially folded about the heads or ends *d* as shown in Fig. 12, and the heads or ends are then stapled to cleats *b* of side sections *a* of the crate. The illustrative machine is designed for use in performing this last operation, that is for use in fastening the end section *d* to cleats *b* of one or more side sections and is designed to operate within the crate, close to the sides thereof and in the corners and to drive staples through the head or end *d* into or through cleats *b*.

As illustrated in Fig. 1 the invention is embodied in an end stapling machine of the type disclosed in the patent to Thompson No. 1,295,237 issued February 25, 1919, consisting generally of staple forming and driving mechanisms, and clamping or clinching mechanism to co-operate therewith during staple driving operations. It will be understood, however, that the invention is not limited to the particular end stapling machine illustrated but may be embodied in other types of which there are several.

The illustrative machine is supported by the frame 1 which carries arms 2 and 3 having an opening therebetween to permit the insertion of a cleat of a box or crate and an end or head as shown in Fig. 1. Arm 2 which carries the staple driving mechanism is formed with a narrow nose adapted to enter the box or crate, close to the sides thereof and in the corners and arm 3 carries the clincher mechanism for clamping the box or crate parts in position during the staple driving operation and for clinching any staples that may be driven through the materials. Staples 4 are formed from wire 5 by staple forming mechanism (not shown) located at the rear of the machine and are fed forward to the nose of arm 2 with their points upstanding in the manner illustrated in said patent to Thompson above referred to. From the nose of arm 2 the staples are driven upward through the head or end $d$ into the cleats $b$ of the box or crate.

The mechanisms for forming, feeding and driving the staples and the clincher mechanism need not be shown or described in detail as said mechanisms are fully shown and described in the patent to Thompson above referred to.

In operation the head or end $d$ is placed upon the upper surface of the lower arm 2, and the three sides of the box or crate are wrapped about the head or end with the cleats $b$ above the end $d$. Staples are then driven at intervals through the head or end $d$ into the cleats $b$ of side sections $a$ of the box or crate, the work being shifted by the operator after each stapling operation.

To increase the holding power of the staples it is desirable to drive them along the longitudinal center line of the cleats. As shown in Figs. 4, 5 and 6 therefore, the driving point $x$ is located at such a distance relative to the nose of the arm 2 that when a box or crate is placed upon said arm the side material of the box or crate will not prevent the proper positioning of the cleat over the driving point.

Heretofore, as in the machine of the Thompson patent above referred to, the work was positioned for a stapling operation by the nose of the stapling arm 2 which contacted with or engaged the side material of the box as it was pressed against the nose by the operator and as the box was shifted for each stapling operation the nose of the stapling arm dragged along the inner surface of the side material thus positioning the driver relative thereto and relative to the cleat. Such work-controlling means is effectual for positioning a box or other packing case having in effect integral or continuous side material. It has been found in practice, however, that when a crate or other packing case having openings in the side material is being operated upon that the nose of the stapling arm often catches in such openings or partially passes through them thus improperly positioning the work, causing inaccurate positioning of staples and otherwise delaying the stapling operation.

In the illustrative machine, work-controlling means for properly positioning the materials for the fastening operation regardless of openings in the sides of the package is provided.

As illustrated said means takes the form of an attachment to the under side of the nose of upper arm 3. It will be understood, however, that said attachment may be formed as an integral part of the upper arm 3 without departing from the invention.

The illustrative work-controlling means is designed to position or gauge the work for a stapling operation from the cleat $b$ of the illustrated crate, which as shown in Fig. 12, has no openings into which the work-controlling means may enter as the work is shifted for successive operations. Said work-controlling means is also designed to position the longitudinal center line of the cleat directly above the staple driver regardless of the angle at which the cleat is held relative to the longitudinal center line of the stapling arm 2.

Referring to Figs. 8 to 11 the illustrative work-controlling means comprises a positioning member 6 movable in a semi-circular path about the driving point $x$ as a center and adapted to engage a cleat of the illustrative crate and so position the parts relative to the staple driving point and the nose of the stapling arm that the cleat will be properly positioned over the staple driving point, and openings in the side material of the crate will be held clear of engagement with the nose of lower arm 2.

As shown in Figs. 8 to 11 the positioning member 6 is carried by a semi-circular member 7 which is adapted to rotate in semicircular rabbeted groove 8 formed in a body member 9 bolted to the lower surface of the nose of the upper arm 3 by means of screws 10. The circular groove 8 in which the member 7 rotates is positioned about the driving point $x$ as a center so that member 6 in whatever position it may be relative to the longitudinal center line of the arm 2 will always be at the same distance relative to the stapling point $x$ and the member 6 is so located relative to the driving point that when a cleat is pressed against said member the longitudinal center line of the cleat will be positioned directly above the driving point $x$ and so long as the cleat is pressed against member 6 its longitudinal center line will always be directly above the driving point regardless of the shifting of the cleat or the angle at which it is held relative to the longitudinal center line of the stapling arm.

As shown in Figs. 4, 5 and 6 the crate is shifted over the driving point for each succeeding stapling operation and in stapling the end to cleats of successive adjacent sides said cleats are held at various angles to the longitudinal center line of the stapling arm. Member 6, however, accommodates itself to this shifting of the work by moving about the driving point $x$ maintaining, at all times, the same relative distance therefrom and always correctly positioning the cleat above the driving point regardless of the angle at which it is held relative to the longitudinal center line of the stapling arm. This action of member 6 is clearly illustrated in Figs. 4, 5 and 6, which show the manner in which the member 6 is rotated about the driving point $x$ by pressure of a cleat thereagainst. In Fig. 4 the cleat being operated upon is held at approximately a right angle to the longitudinal center line of the arm 2 and in this position the member 6 assumes a position about midway between the extremities of its semi-circular path of travel and properly positions the cleat above the driving point $x$ while holding the side material clear of engagement with the nose of the stapling arm. In Fig. 5 the cleat being operated upon is held approximately parallel with the tapered side of the stapling arm and the member 6 has been shifted to one extreme of its semi-circular path. In this position the same relationship between the driving point and the longitudinal center line of the cleat is maintained and the side material is held free of engagement with the nose of the machine. Fig. 6 is the reverse of Fig. 5 showing the work-controlling member at the other extreme of its path of movement. Figs. 4, 5 and 6 respectively show cleats being operated upon at three different angles to the longitudinal center line of the stapling arm. The cleats when shifted are often held at angles different from those shown particularly when staples are being driven into the corners of the box or crate. The work-controlling means, however, will accommodate itself to any angle at which the cleat being operated upon is held relative to the longitudinal center line of the stapling arm, and regardless of the angle at which the cleat is held relative to the longitudinal center line of the stapling arm the longitudinal center line of the cleat will always be correctly positioned directly above the stapling point and the nose of the stapling arm will be held clear of openings in the side material.

Obviously, the invention is not limited to the specific embodiment illustrated and described, which may be variously modified in details of construction and arrangement, and features of the invention may be used in various machines embodying the invention, and in various combinations and sub-combinations.

Having described the invention what is claimed is:

1. A machine for use in making boxes or crates functioning to fasten heads or ends to cleat-reinforced boxes or crates, which comprises staple driving mechanism adapted to operate within a box or crate; and work-controlling means to hold the side material of the box or crate clear of the nose of the machine and to position the longitudinal center line of a cleat at the driving point regardless of the angle at which the cleat is held relative to the longitudinal center line of the machine; said work-controlling means comprising a work-engaging member movable in a semi-circular path about the driving point as a center.

2. A machine for use in making boxes or crates functioning to fasten heads or ends to cleat-reinforced boxes or crates, which comprises staple driving mechanism adapted to operate within a box or crate; and cleat-engaging means movable in a semi-circular path about the driving point for positioning the longitudinal center line of a cleat at the driving point regardless of the angle at which the cleat is held relative to the longitudinal center line of the machine.

3. A machine for use in fastening heads or ends to cleat-reinforced boxes or crates, having an arm adapted to operate within a box or crate, close to the sides thereof and in the corners, which comprises mechanism for driving a staple from the nose of said arm; and work-engaging means rotatable about the driving point to prevent said nose from entering openings in the sides of the box or crates and to correctly position the materials for a stapling operation regardless of the angle at which the cleats are held relative to the longitudinal center line of said arm.

4. A machine for use in fastening heads or ends to cleat-reinforced boxes or crates, having an arm adapted to operate within a box or crate, close to the sides thereof and in the corners, which comprises mechanism for forming a staple and driving it from the nose of said arm upward into the work; and work-engaging means rotatable about the driving point to prevent the nose of said arm from entering openings in the sides of the box or crate and to position the longitudinal center line of a cleat above the driving point regardless of the angle at which the cleat is held relative to the longitudinal center line of said arm.

5. A machine for use in fastening heads or ends to cleats of a cleat-reinforced box or crate, having an arm adapted to operate within a box or crate, which comprises mechanism for driving a staple from the nose of said arm; and work-controlling means rotatable about the driving point as a center and adapted to engage and position the work for a driving operation.

6. A machine for use in fastening heads or ends to cleats of a cleat-reinforced box or crate, having an arm adapted to operate within a box or crate, which comprises mechanism for driving a staple from the nose of said arm; and work-controlling means movable in a semi-circular path and adapted to engage and position the work for a driving operation.

7. A machine for use in fastening heads or ends to boxes or crates, having an arm adapted to enter a box or crate, which comprises mechanism for driving a staple from the nose of said arm; and work-controlling means movable in a semi-circular path about the driving point and adapted to engage and position the work for a driving operation.

8. A machine for use in fastening heads or ends to cleat-reinforced boxes or crates, having an arm adapted to enter a box or crate, close to the sides thereof and in the corners, which comprises mechanism for driving a staple from the nose of said arm; and cleat-engaging work-controlling means movable in a circular path about the driving point as a center.

9. A machine for use in fastening heads or ends to cleat-reinforced boxes or crates, having an arm adapted to enter a box or crate, which comprises mechanism for driving a staple from the nose of said arm; and work-controlling means movable in a circular path about the driving point and adapted from any point in said path to position a cleat pressed thereagainst for a stapling operation.

10. A machine for use in fastening heads or ends to cleat-reinforced boxes or crates, having an arm adapted to enter a box or crate, close to the sides thereof and in the corners, which comprises mechanism for driving a staple from the nose of said arm; and work-controlling means movable in a circular path about the driving point and adapted to engage the side of a cleat pressed thereagainst and to position the longitudinal center line of the cleat in position to receive the staple.

11. In a box or crate end stapling machine having fastener-setting mechanism constructed and arranged to operate within a box or crate to fasten a head or end thereto, work-controlling means to position relatively said mechanism and the box or crate parts comprising the positioning member 6 carried by the semi-circular member 7 and movable in the semi-circular rabbeted groove 8 of the body member 9.

12. In a box or crate end stapling machine having fastener-setting mechanism constructed and arranged to operate within a box or crate to fasten a head or end thereto, work-controlling means to position relatively said mechanism and the box or crate parts comprising a work-positioning member movable in a semi-circular path about the driving point as a center.

13. In a box or crate end stapling machine having fastener-setting mechanism constructed and arranged to operate within a box or crate to fasten a head or end thereto, work-controlling means to position relatively said mechanism and the box or crate parts comprising a work-engaging member movable in a semi-circular path.

14. A machine for use in fastening heads or ends to boxes or crates, which comprises staple driving mechanism adapted to operate within a box; and means relatively to position said mechanism and the work including a gauge rotatable about the driving point.

15. A machine for use in fastening heads or ends to boxes or crates, which comprises staple driving mechanism adapted to operate within a box; and means relatively to position said mechanism and the work including a work-engaging gauge movable in a semi-circular path.

In testimony whereof, I have signed my name to this specification.

OSCEOLA C. THOMPSON.